US007146295B2

(12) United States Patent
Goodman et al.

(10) Patent No.: US 7,146,295 B2
(45) Date of Patent: Dec. 5, 2006

(54) COMPUTERIZED DESIGN METHOD AND APPARATUS FOR DRAINAGE SYSTEMS

(75) Inventors: Thomas D. Goodman, Bay City, MI (US); Patrick A. Race, Bay City, MI (US)

(73) Assignee: FBE Associates, Inc., Bay City, MI (US)

( * ) Notice: Subject to any disclaimer, the term of this patent is extended or adjusted under 35 U.S.C. 154(b) by 742 days.

(21) Appl. No.: 10/222,405

(22) Filed: Aug. 15, 2002

(65) Prior Publication Data
US 2003/0036889 A1 Feb. 20, 2003

Related U.S. Application Data

(60) Provisional application No. 60/312,601, filed on Aug. 15, 2001.

(51) Int. Cl.
*G06F 17/50* (2006.01)
(52) U.S. Cl. .............................. 703/1; 404/3; 250/302; 210/163
(58) Field of Classification Search .................... 404/3; 250/302; 703/1; 52/20; 119/482; 156/71; 210/163; 405/36; 249/11
See application file for complete search history.

(56) References Cited

U.S. PATENT DOCUMENTS

| | | | | |
|---|---|---|---|---|
| 4,484,724 A | * | 11/1984 | Srackangast | 249/11 |
| 4,964,060 A | * | 10/1990 | Hartsog | 703/1 |
| 5,645,367 A | * | 7/1997 | Gunter | 404/3 |
| 5,852,901 A | * | 12/1998 | Meyers | 52/20 |
| 2001/0023842 A1 | * | 9/2001 | Singleton | 210/163 |
| 2002/0164209 A1 | * | 11/2002 | Allard et al. | 405/36 |
| 2003/0071212 A1 | * | 4/2003 | Weiland et al. | 250/302 |
| 2003/0141230 A1 | * | 7/2003 | Mokrzycki | 210/163 |
| 2003/0230373 A1 | * | 12/2003 | Ianniello | 156/71 |
| 2004/0020445 A1 | * | 2/2004 | Bauman | 119/482 |

OTHER PUBLICATIONS

Michael C. Fu, "An architecture for collaborative problem solving control in associate systems", a thesis submitted to the university of Illinois at Urbana-Champaign, 1997.*

* cited by examiner

*Primary Examiner*—Kandasamy Thangavelu
(74) *Attorney, Agent, or Firm*—Reising, Ethington, Barnes, Kisselle, P.C.

(57) ABSTRACT

A drainage system design method and apparatus including a computer program that enables a computer user to design and obtain computer-generated stackings of drainage system structures such as manholes. The user inputs dimensional and structural information concerning the drainage system. The program is operable to access a set of predefined drainage system components and, using the inputted dimensional and structural information, the program determines different configurations of the predefined components that represent a structure contained in the drainage system. The program displays different configurations of stackings sorted based on predefined goodness criteria. The program can also determine one or more drainage system designs that comprise a configuration of the predefined components for each of two or more of the structures contained in the drainage system, and can display and output site plans, elevational views, shop drawings, and bills of material.

27 Claims, 15 Drawing Sheets

COMPUTERIZED DESIGN METHOD AND APPARATUS FOR DRAINAGE SYSTEMS

CROSS-REFERENCE TO RELATED APPLICATION

This application claims the priority of U.S. Provisional Application No. 60/312,601, filed Aug. 15, 2001, the entire contents of which is hereby incorporated by reference.

TECHNICAL FIELD

This invention relates generally to use of computer software for designing underground sewer and storm water drainage systems and, more particularly, to software used for designing manhole stackings and complete manhole systems built from precast components including such things as bases, pipes, risers, reducers, cones, adjusting rings, and covers.

BACKGROUND OF THE INVENTION

Manhole structures used in sanitary and storm water drainage systems are commonly built using stackings of precast manhole sections. Each precast manufacturer owns or can rent forms to create precast pieces of pre-defined sizes. These standard size pieces are stacked vertically to achieve the desired height and other constraints. While there may be many different configurations of the precast pieces that will achieve a desired stacking, it is usually desirable to select the configuration that provides the least expensive solution. Historically, the process of selecting manhole sections to achieve a desired stacking has been carried out manually by a person knowledgeable about the available components, their cost, availability, and other such factors. However, the selection process becomes complex as the constraints for evaluating solutions become more complex.

Precast concrete pieces are manufactured in both standardized and custom sizes and each piece can have holes cut, formed, or drilled into it as needed for the pipe inlets into the structure. While some components can be used directly from stock, many components must be customized by creating openings for pipe connections. The size, shape and position of these openings make these components custom, but they are manufactured to standard sizes and shapes where possible. Where custom size components are used, the height is the only parameter that is changed for most of the custom work.

When determining a particular manhole stacking, there are several tool constraints that normally come into play, including component diameter, height, and joint configuration. In particular, precast concrete for round manholes is typically manufactured only in certain diameters (normally 6" increments starting with 24" diameter). The height is also commonly stocked in standard sizes of 6", 8", or 12" increments and semi-custom sizes in 1" or 2" increments. For virtually all manhole work, height differentials below 1" are too small to be meaningful. The shape of the male and female fittings on the top and bottom of each piece is standardized so that pieces from different manufacturers may be mated. It is rare to use nonstandard joints.

Some aspects of the selection process are driven by the engineering specifications for the job. Typical constraints that limit the selection choices are:

1. Eccentric Cone vs. Concentric Cone—Most localities prefer eccentric cones, but some do prefer concentric cones for shallow structures.

2. Integral Base, Extended Integral Base, Separate Base—Locality preference and contractor preference will drive the selection of base, but when other considerations make the preferred base unworkable, substitutions are allowed.

3. Height of Casting/Lowest Invert—The structure should achieve the desired height within design tolerances.

4. Min. Adjustment, Max. Adjustment—The structure is normally required to have adjustability provided by the use of adjusting rings, and there is a minimum and maximum height of adjusting rings required for each structure.

5. Openings Too Close—When openings are too close to each other, the structure size must be increased to insure that there is sufficient concrete between the openings to maintain structural integrity.

6. Opening Size—The opening required on the top of the structure may be very small (24"), large (enough for a 250 hp motor), or anything in between. The choice of opening size will dictate the cones/covers that are available for use.

7. Steps vs. No Steps—Some sections are too small to allow steps to be placed on them.

8. Step Placement Technology

9. Wall Thickness—While most precast for manholes have the same wall thickness as precast pipe of the same diameter, some localities require special wall thicknesses that are non-standard.

Manhole producers typically execute several steps to provide customers with precast sections and incidental products. In general these steps are estimate and quote, structure takeoff description, shop drawing generation, bill of material (BOM) generation, and shipping and invoicing form generation.

Developing a structure takeoff description involves several steps that, if not done correctly, can lead to improper stackings and problems with the pipe connections from one manhole structure to the next. Even when done correctly, the process of generating optimal stackings can be time consuming. The process involves defining each manhole structure's relationship with other structures in the system, locating (positioning) the structures within a validated site plan, defining the structures using top of casting and bottom invert information, defining the structure's inverts, and finally, determining the best stacking for each structure. Only then can proper system drawings be produced.

It is thus a general object of this invention to provide an automated process for designing and specifying completed drainage systems and/or the individual structures used in these drainage systems.

SUMMARY OF THE INVENTION

The invention provides a computer program stored on a digital storage device for use in designing drainage systems wherein the program is operable upon execution by a computer to present a user with a graphical user interface on the computer that enables the user to input into the computer dimensional and structural information concerning the drainage system. The program is operable to access a set of predefined drainage system components and, using the inputted dimensional and structural information, the program is operable to determine different configurations of the predefined components that represent a structure contained in the drainage system. In accordance with one aspect of the invention, the program is operable to select at least one of the configurations based on one or more criteria and is operable to present the selected configuration(s) to the user via the graphical user interface. In accordance with another aspect of the invention, the program is operable to determine one or more drainage system designs that comprise a configuration of the predefined components for each of two or more of the structures contained in the drainage system.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The following description is directed to the structure and operation of the illustrated embodiments, which are designed for use in generating a selection of optimized manhole stackings as well as an overall drainage system design for a particular drainage system using precast manhole components and other design constraints such as, for example, local municipal construction rules and heuristic limits that eliminate equivalent alternative designs. However, although the illustrated embodiment is described in conjunction with designing manhole structures and drainage systems using manhole structures, it will be understood by those skilled in the art that the illustrated program can be used in the design of other structures as well, such as, for example, catch basins.

Figure 1:
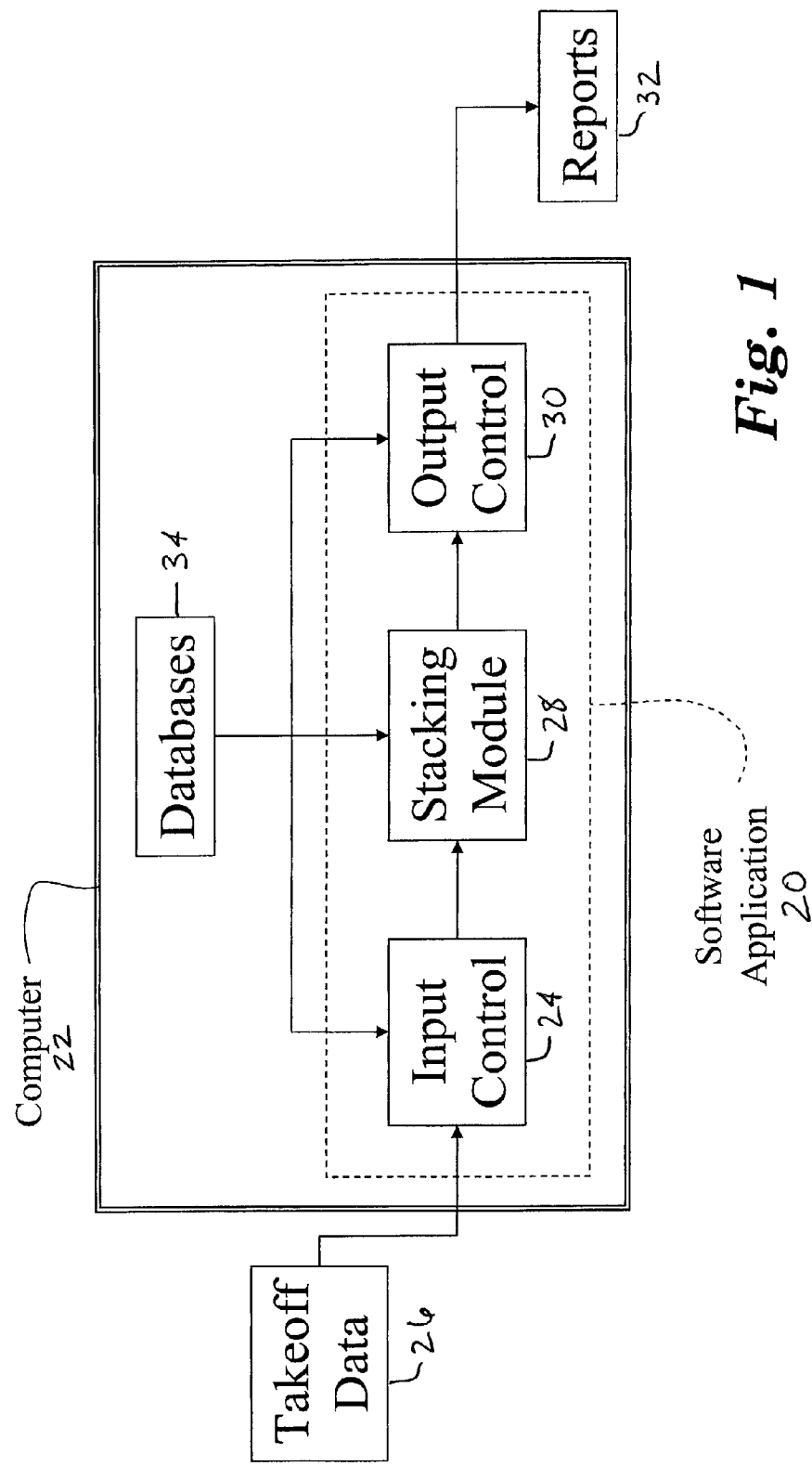
FIG. 1 is a block diagram depicting an embodiment of a drainage system design program of the present invention.

As shown in FIG. 1, the drainage system design program can be implemented as a software application 20 that includes at least one executable program module together with any associated library or other associated files. The program 20 can be a standalone software application running on a workstation or can be executed remotely on a server, or can be implemented as a client software application in a client/server configuration with portions of the data or executable program being divided between a client computer and server. The program is stored in a computer 22 on a digital storage device such as a fixed magnetic drive (hard drive) which can be accessed and read by the computer 22 under control of its microprocessor. Of course, the program can be stored on other types of digital storage devices, such as read/write memory (RAM) or an optical device such as a CDROM or DVD. Although not explicitly shown, the computer 22 includes the standard internal and peripheral components including a monitor and input devices such as a keyboard and mouse.

The program 20 includes an input control module 24 used in collecting takeoff data 26 and other relevant dimensional and structural information from a user concerning the drainage system being designed. The program 20 also includes a stacking module 28 that permits one or more stacking configurations to be determined for each manhole in the drainage system—either manually or automatically, but either way under control of the program. Finally, the program 20 includes an output control module 30 that allows the user to generate reports 32 (drawings, bill of materials) for the individual structures and overall drainage system. User interaction with each of these modules is by way of a graphical user interface that guides the user through the different steps in the overall design process and enables the user to input information via different standard user interface components, including check boxes, buttons, text fields, etc. The program can be written in any of a number of programming languages, such as, for example, Microsoft Visual Basic™ and the implementation of the various software modules and routines described below is well within the level of skill in the art of computer programming.

Figure 2:
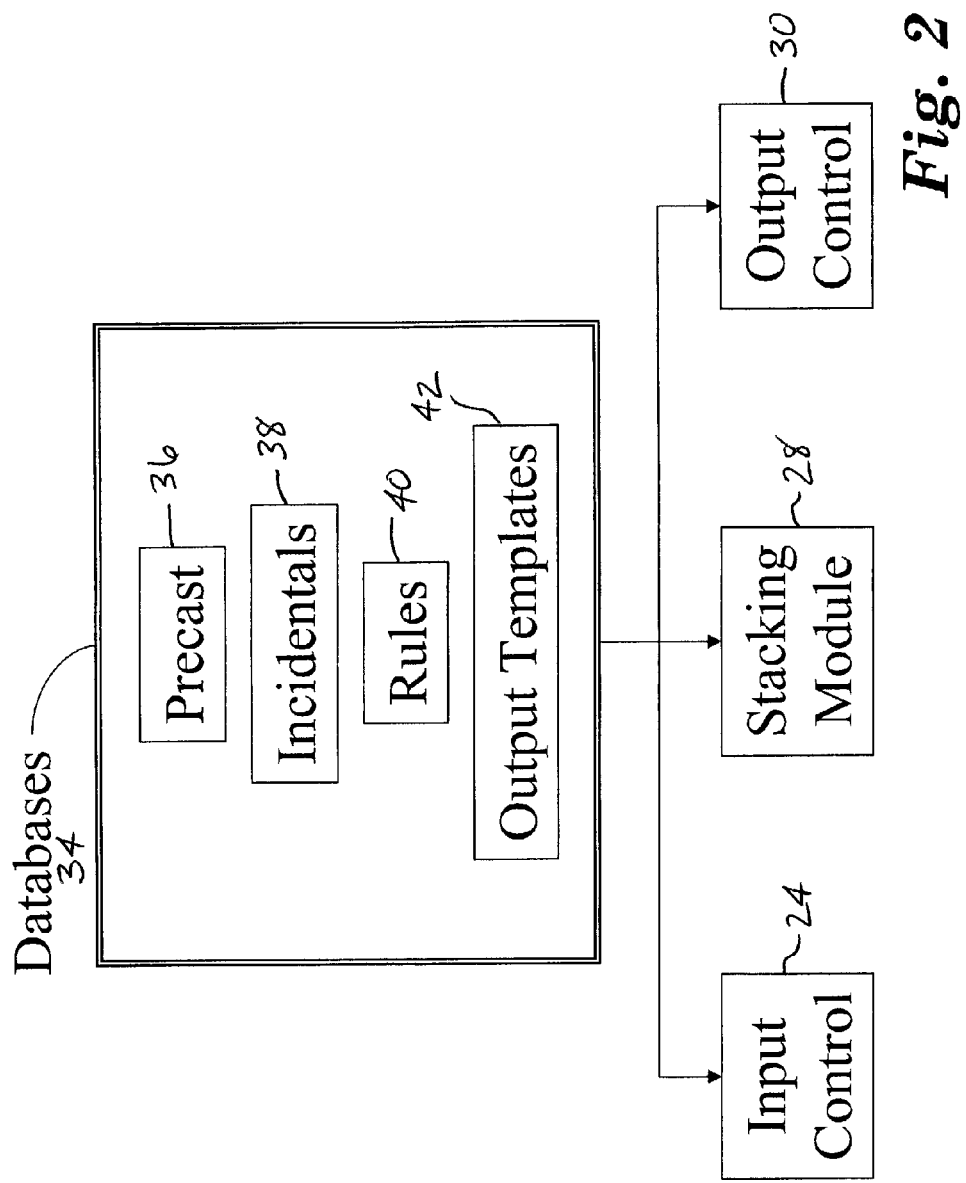
FIG. 2 represents different databases, or groups of data stored in a single database, that is utilized by the program of FIG. 1.

In general, the process of setting up the databases 34 (or database) of FIG. 2 involves populating the databases 34 with various types of information, including precast manhole section data 36, incidental deliverables 38 (e.g., joint seals, mortar, connectors, and castings), and customer (i.e., the precast manufacturer) rules 40 regarding the description and use of its precast components. These rules 40 can also include applicable governmental rules, although such information could be stored separately or not used at all. As indicated in FIG. 2, these databases 34 provide information to the input control module 24 (FIG. 3), stacking module 28 (FIG. 4), and output control module 30 (FIG. 5). These groups of data can be stored in an MS Access™ database table or tables. Output templates 42 are also provided in the form of an AutoCAD™ drawings database made up of AutoCAD™ templates and block drawings. The output templates 42 are used by the program 20 to create a site plan drawing and shop drawings for each individual structure. The AutoCAD™ dictionaries allow developers to store and access third party data. This data is used in association with the AutoCAD™ drawings database to create the site plan and shop drawings for a particular drainage system. As will be appreciated by those skilled in the art, any other suitable third party database systems and drawing packages can be used in addition to or in lieu of the Access™ and AutoCAD™ programs mentioned above. For example, in lieu of AutoCAD™, the AVAX™ Vector ActiveX control can be used and is available from CivilTech located in Greece and on the World Wide Web at www.civiltech.gr (Greek) or business.hol.gr/gardos (English). Alternatively, the database and drawing functions can be coded into the drainage system design program 20 itself.

Figure 3:
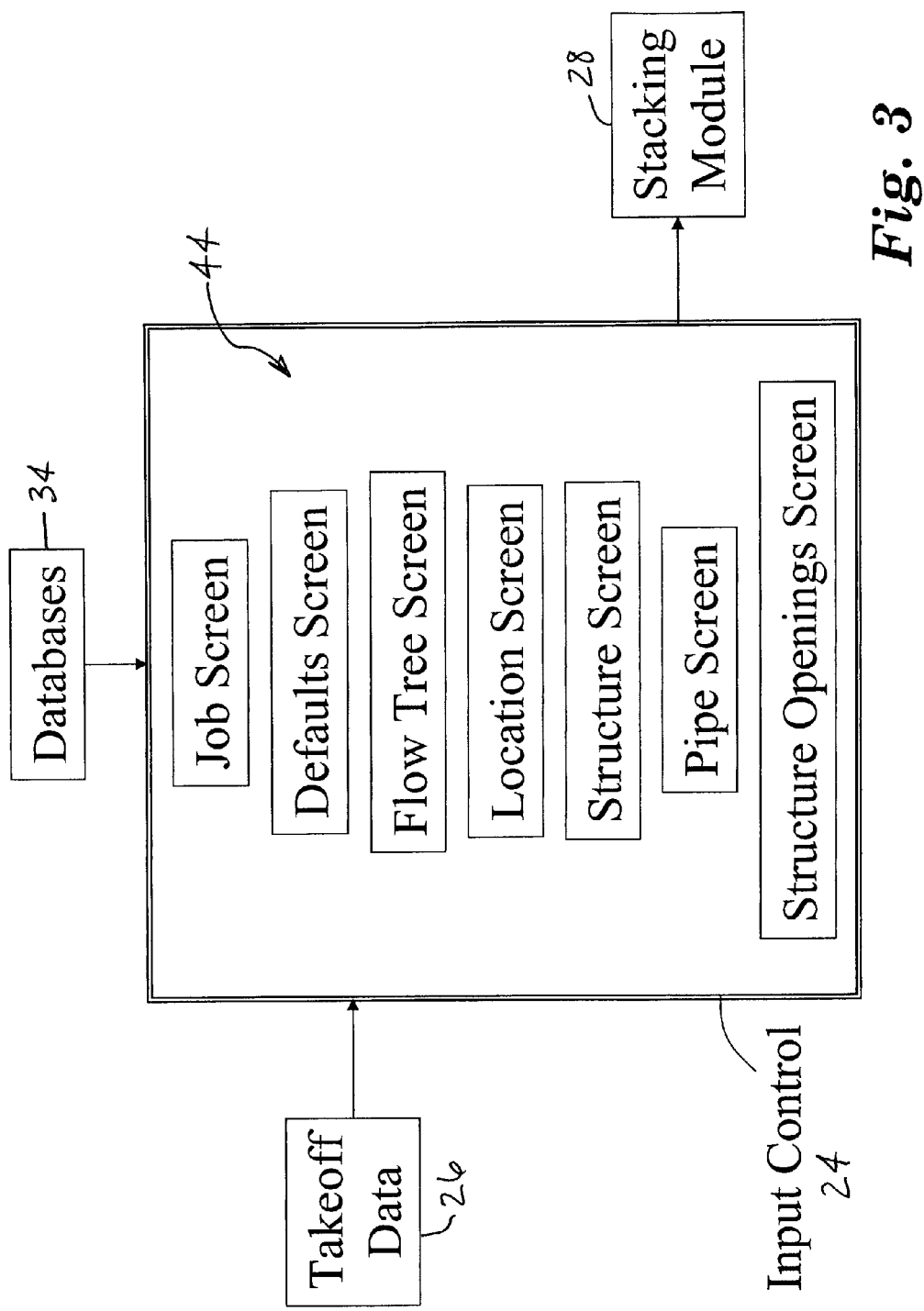
FIG. 3 diagrammatically depicts different screen displays presented by the program of FIG. 1.

Turning now to FIG. 3, the program 20 produces a graphical user interface that includes a number of screen displays 44 that enable a user to input the takeoff data 26. This GUI is produced by the input control module 24 which guides the user through the various screen displays used to capture the information needed by the program to design the drainage system and individual structures using the precast, incidental, and rules data previously stored in the databases 34. All the user input required by the program 20 to stack structures can be entered on these screens. With this information and the databases, the program can completely stack an entire drainage system. The resulting information is provided to the stacking module which will now be described briefly in conjunction with FIG. 4.

Figure 4:
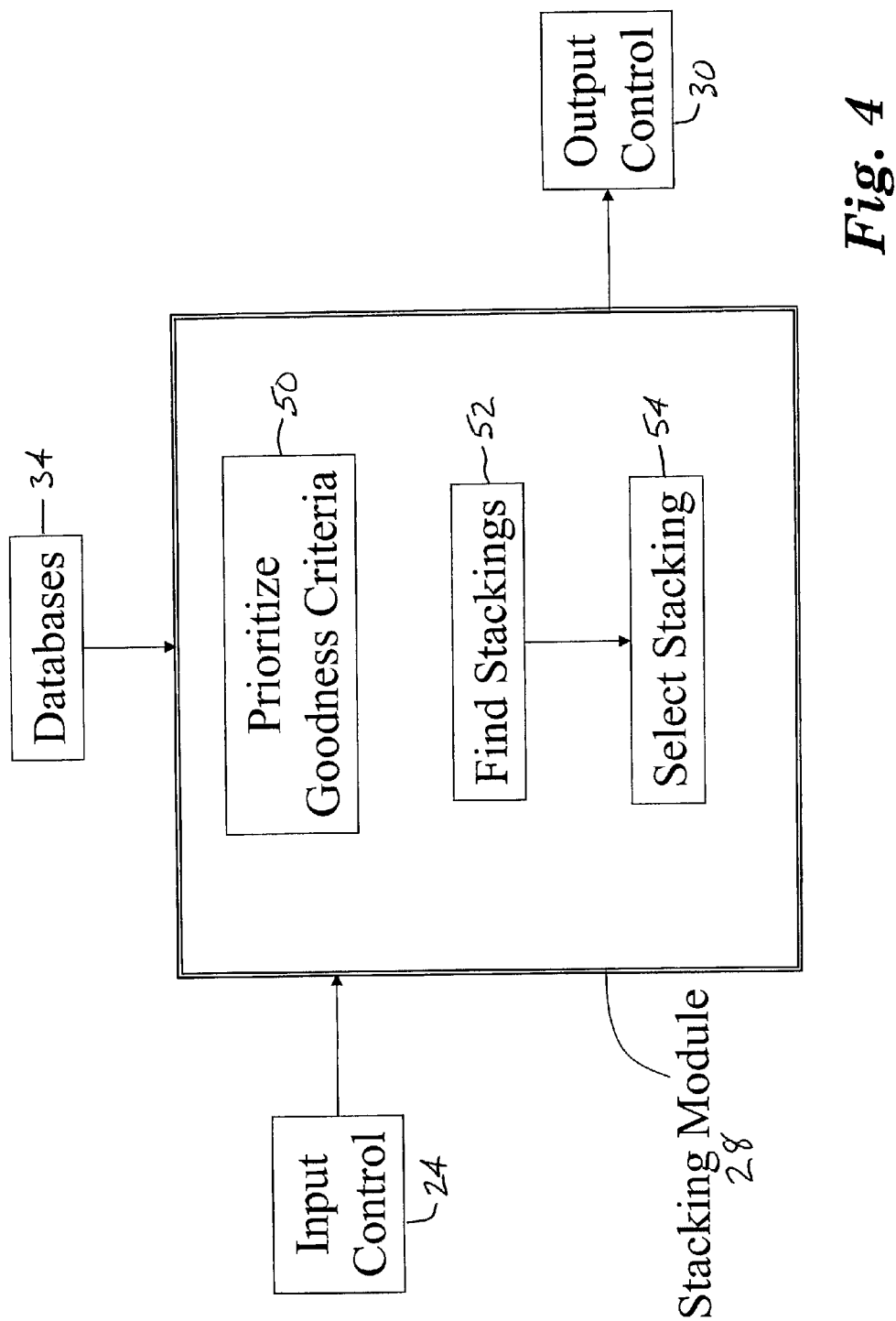
FIG. 4 is a block diagram representing a stacking module that is a part of the program of FIG. 1.
Figure 5:
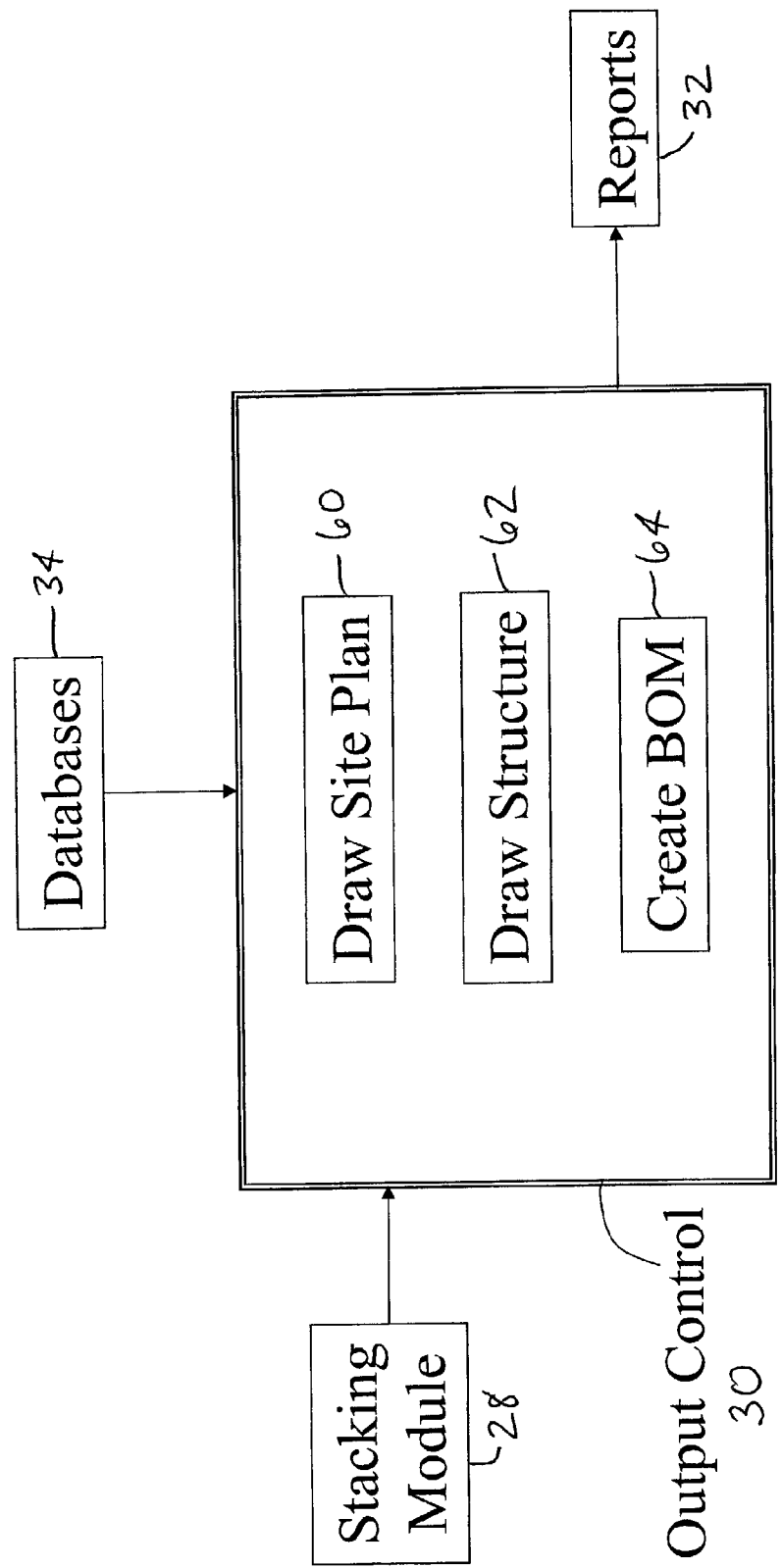
FIG. 5 is a block diagram representing an output control portion of the program of FIG. 1 which enables a user to generate output reports depicting the different configurations and drainage system designs produced by the stacking module.

As shown in FIG. 4, the stacking module 28 includes three main processes: prioritizing goodness criteria 50 used to determine one or more optimized stackings; a find stackings routine 52 which does the actual determination of the optimized stackings; and a select stacking routine 54 which displays the optimized stackings for the user so that the user may choose between different stacking configurations. This module 28 stacks each structure after the data has been entered into the program 20 through the input control module 24. First, the goodness criteria should be prioritized as will be described further below in connection with FIG. 10. This could include finding the least cost solution, limiting the number of joints, or some other requirement. Once set, the criteria will be used for all stacking solutions. When the user initiates the find stackings routine 52 for a particular structure, the program 20 finds all the suitable stackings for that structure. After the stacking algorithm has run, a number of optimized stackings are presented to the user so that the user can select a single stacking from the list stackings.

Two embodiments of this process are shown in detail in FIGS. 9 and 12–15. The data associated with the selection of this structure will be used in the creation of the shop drawings and the bill of materials.

FIG. 5 depicts a block diagram for the output control module used to generate drawings 60 and 62, bills of material 64, and other such reports 32 for a completed stacking or drainage system design. This output control routine 30 can be executed once all of the system structural and dimensional information (e.g., location, structure, pipes, openings, and flow information) has been input and the stackings for the drainage system have been determined and selected by the user. This module 30 allows the user to obtain site plan 60 and elevational drawings 62 of the drainage system, create shop drawings for each of the structures in the system, and create a bill of material 64 for one, some, or all of the structures making up the drainage system.

Figure 6:
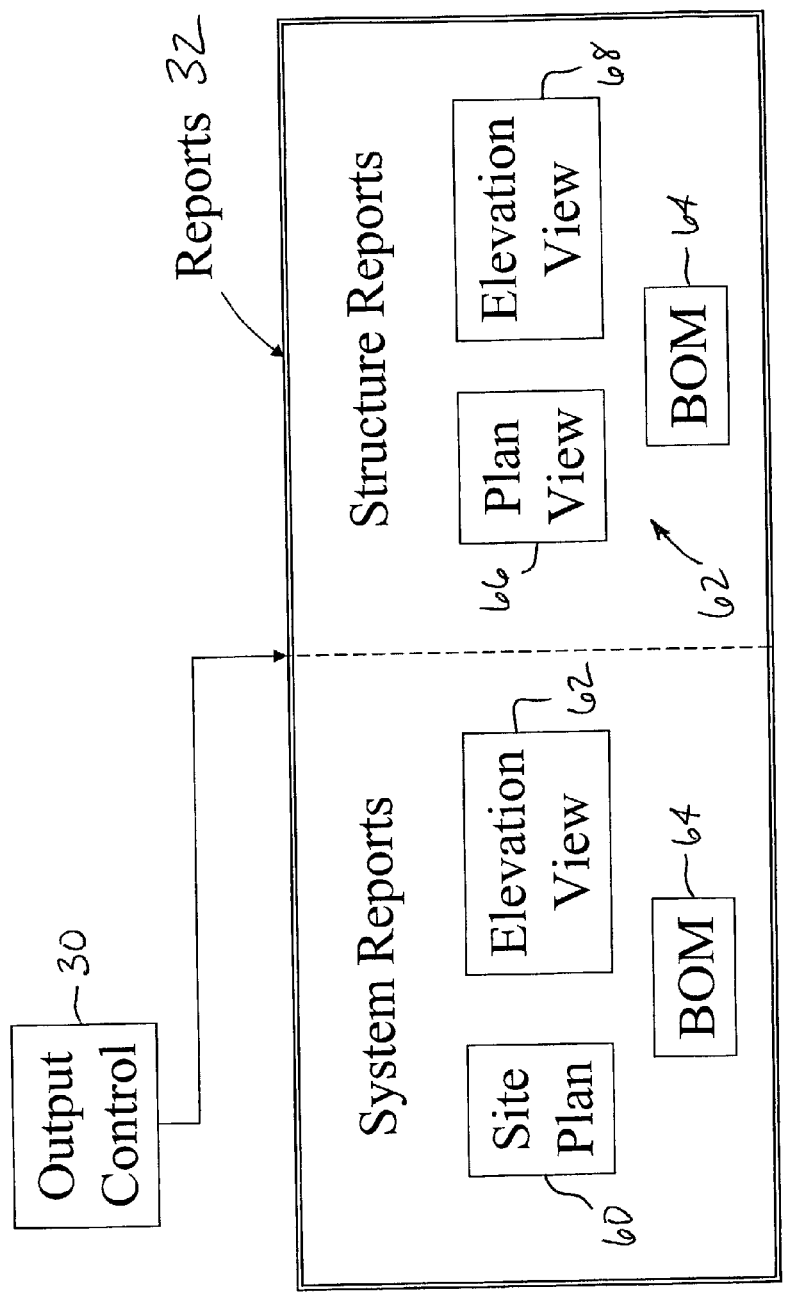
FIG. 6 depicts the various structure and drainage system design reports that can be generated by the output control module.

FIG. 6 depicts the various reports 32 created by the output control module 30. The user can select any or all of these reports via the program's graphical user interface. The user can create a site plan 60 and/or elevation view 62 to check the takeoff data 26 against engineering drawings. A bill of material 64 may be created for the entire drainage system or a single structure. A shop drawing may also be generated by the program which is useful in the manufacturing of the structure. This drawing contains both plan and elevation views 66, 68 of a single structure or a single component of a structure.

Figure 7:
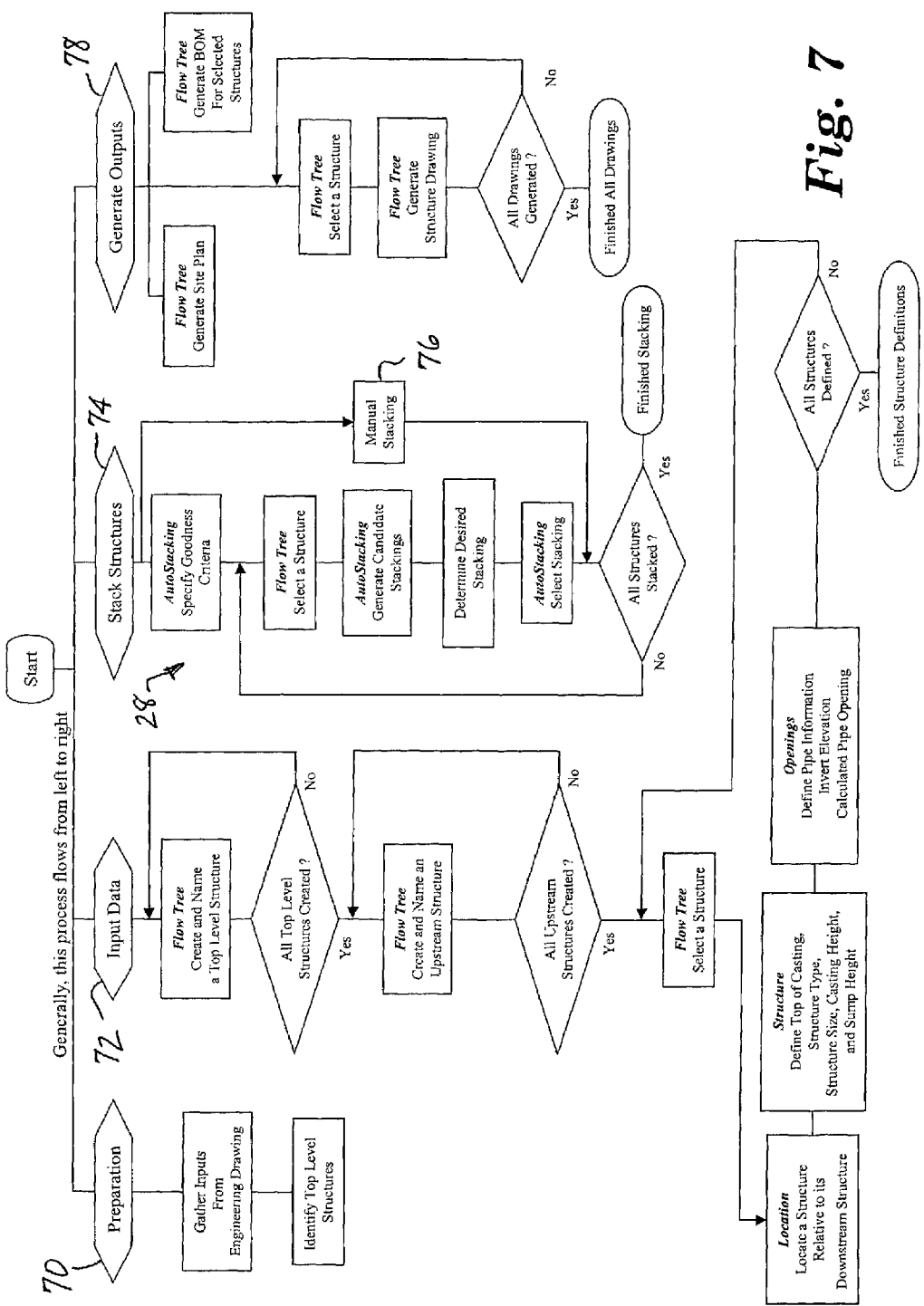
FIG. 7 is a flow chart that depicts the process used by the program of FIG. 1 to permit a user to input dimensional and structural information concerning a drainage system, obtain suitable stackings for manholes used in the drainage system, and then generate reports such as drawings and bills of materials for the system.

Turning now to FIG. 7, the overall process for stacking a drainage system (or any subset of a drainage system) is shown. This process is carried out using the drainage system design program 20 described herein and it will be appreciated that some of the process steps are carried out by the user of the system, whereas others are carried out by the program itself. In addition to populating the various databases used by the program, as described above, the first part of the process involves some preparatory steps 70 for a particular drainage system, including gathering inputs from the engineering drawings and identifying the top level structures (e.g., the root, or lowest elevation level, manholes). Then, as indicated at 72, this structural and dimensional information is input into the program 20. The first step in inputting information is to define a flow tree which involves creating and naming each of the top level structures, followed by creating and naming each upstream structure. Not only are the structures identified and named at this step, but also their interrelationships in terms of flow hierarchy from one structure to the next. This flow tree can then be displayed diagrammatically for the user. Once the flow tree has been created, the user selects each structure one at a time and identifies for the program its location, its particular structural attributes, and the various openings needed for pipe connections. As will be known by those skilled in the art, the structural attributes include such things as the top of casting (grade elevation), structure type (round, square, etc.), structure size, casting height, and sump height. The openings information includes such things as the size of the pipes being connected to the structure, and the elevation at which they are connected. Although the flow chart of FIG. 7 indicates that all of the structures of the flow tree are created before any location or other information is provided for any of those structures, it will be understood that some or all of the structural and dimensional information for a particular structure can be entered after the structure is created in the flow tree and before the next structure in the tree is added. Thus, for example, each structure could be located when it is created and the location verified prior to creating and naming the next structure in the flow tree.

Figure 8:
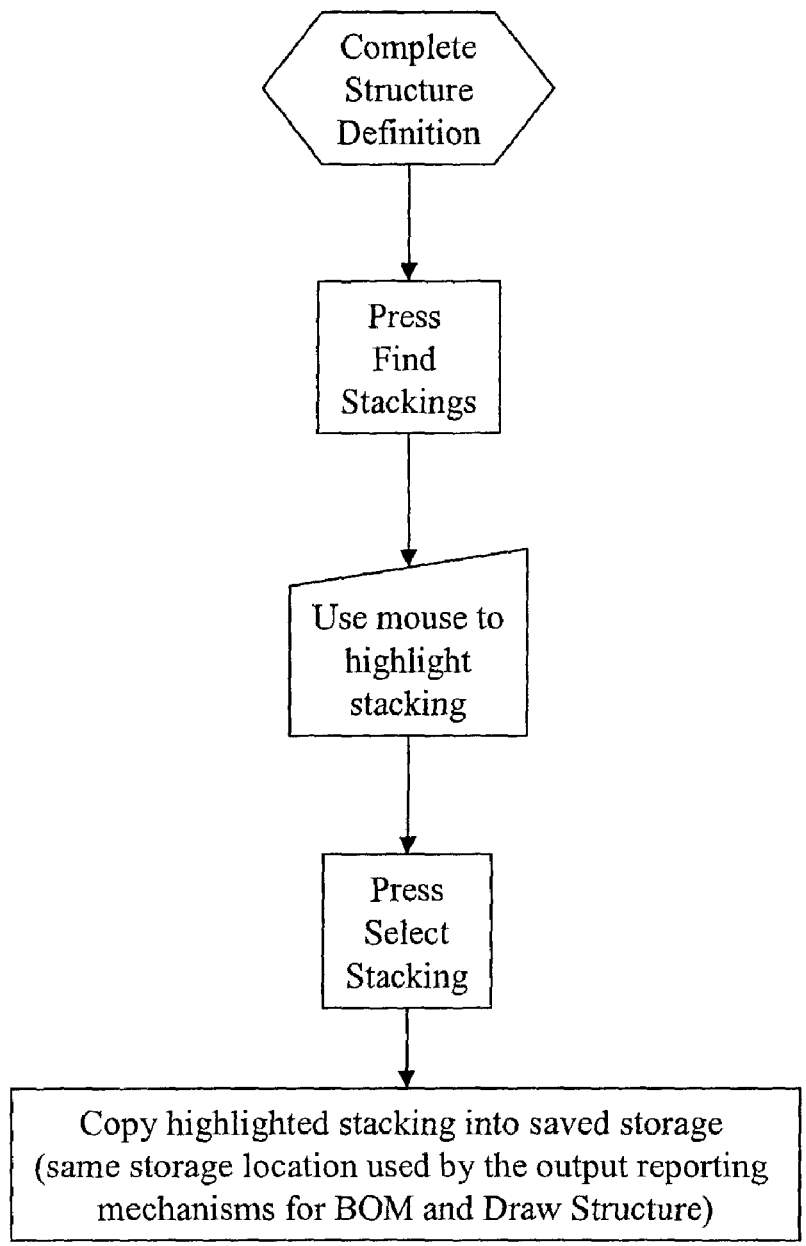
FIG. 8 is a flow chart that provides an overview of how the stacking module of FIG. 4 is utilized by a user to generate one or more stackings.

After the flow tree and individual structures are defined, the next step 74 is to stack each of the structures. Stacking can be carried out automatically by the program 20 using the find stacking routine 28, or manually by the user using the program to select from among available precast components and to define customizations of the components (e.g., openings), which will then be used in the final step to produce shop drawings, system drawings, and a bill of materials. The manual stacking routine 76 aids in the stacking process by allowing the user to specify certain basic information such as the type and general size of the part, and the program 20 then displays a list or graphical image of the available components. The user can then select a desired part, such as by clicking on it and dragging it on the computer screen over to the stacking being built.

Where the find stacking (autostacking) routine 28 is selected by the user, the program stacks each of the structures one at a time by determining, for each structure, one or more configurations of the precast components that represent the structure and that meet the various applicable rules contained in the database 34 (FIG. 2). These successful stackings are then presented to the user by displaying them on the computer screen, with the program giving the user the ability to select among the presented stackings. The generation of stackings continues until: (1) the user selects one of the stackings; (2) all successful stacking possibilities have been generated and presented; or (3) a predefined maximum number of successful stackings have been presented. Referring briefly to FIG. 8, once the structure definitions have been completed, the user can begin the autostacking 28 by clicking on a "Find Stackings" button displayed via the graphical user interface. Once the autostacking routine determines and begins displaying the successful (optimized) stackings, the user can use the computer mouse to highlight a desired stacking, followed by clicking on a "Select Stacking" button. The program 20 then copies the highlighted stacking into saved storage where it can be accessed by the output module for generating drawings and a bill of materials.

As will be described farther below in connection with FIGS. 9 and 10, the determination of successful stackings by the program is carried out using not only the rules but also heuristic limits to eliminate certain stackings, and also using the predefined and prioritized goodness criteria to sort the successful stackings from best to worst. Once the user has selected from among the displayed stackings the elevation and plan drawing of the structure can be created. The fourth process 78 of FIG. 7 is used to generate the various output reports 32. This can be done by displaying the flow tree diagram on the screen and allowing the user to select some or all of the structures to generate any of the drawings or bills of materials shown in FIG. 6. This is especially useful for generating shop drawings of custom or customized components, such as, for example, showing the inverts on a precast component. Once all reports have been generated they can be outputted in different ways. For example, a hardcopy can be printed or they can be outputted to a file as CAD data.

Figure 9:
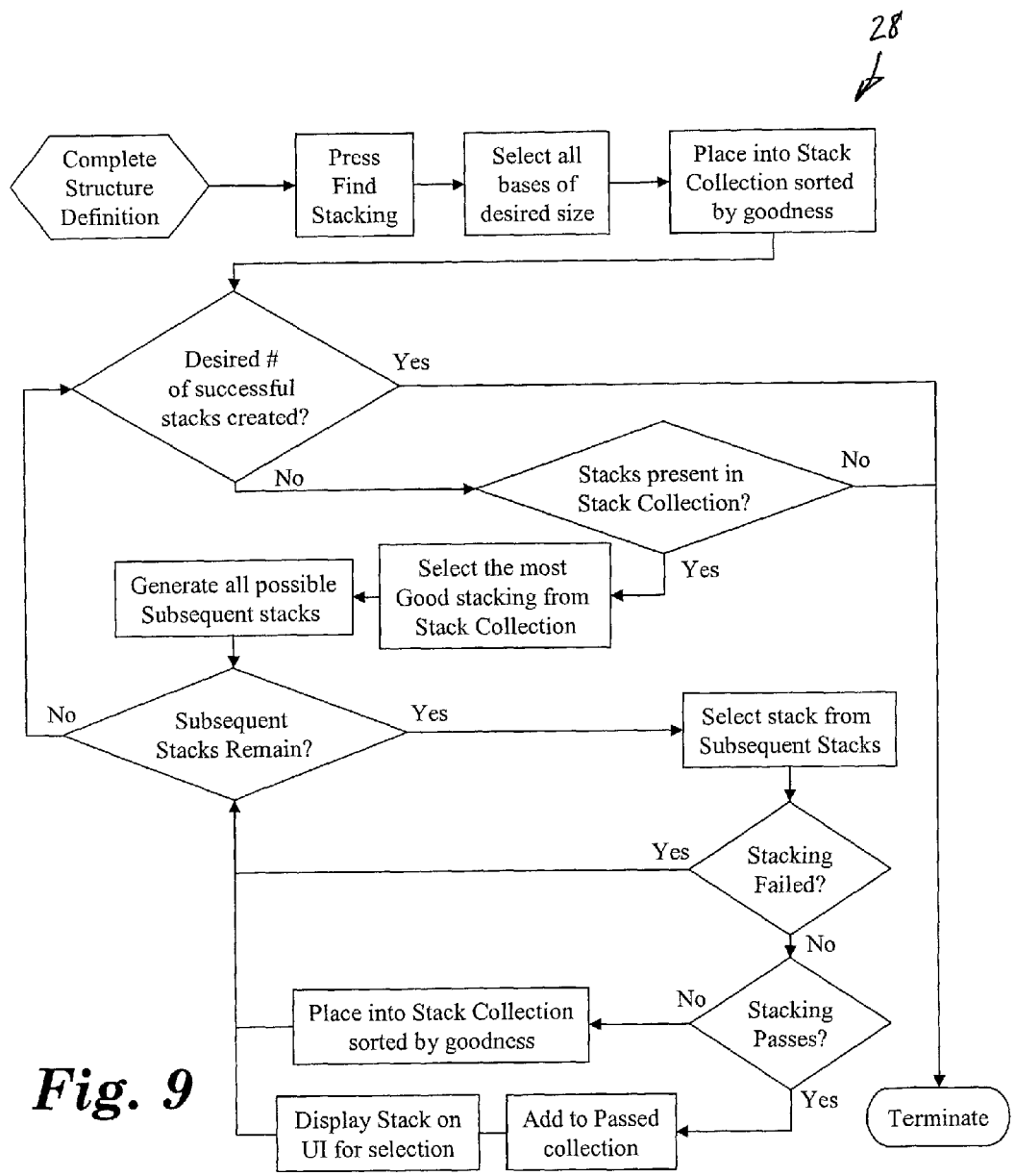
FIG. 9 is a flow chart showing further details of a first embodiment of the stacking routine used by the stacking module of FIG. 4.

FIG. 9 depicts a first embodiment of the autostacking routine 28 in greater detail. When the user selects the "Find Stackings" button, the program accesses the library of precast components and selects all of the initial structure components that meet the structural and/or dimensional information originally inputted into the program 20 for the structure being stacked. For manholes, this would be the bases and the program will select all of the bases having the desired size (e.g., 48", 72"). These initial components are then sorted using the goodness criteria and then inserted in order into a stack collection, which can be implemented in any of a number of different ways known to those skilled in the art. For example, the stack collection can be implemented as a Visual Basic™ collection or as a balanced B-tree. As will be appreciated, the stack collection initially has only a single component (e.g., the base) for each of the stacks in the collection. The remainder of the routine 28 then builds each of the stacks one piece at a time, adding a single component on top and testing each possible resulting combination to see if it fails any of the dimensional requirements, any of the customer or government rules, or any of the heuristic limits. Those that do not fail are then sorted by the goodness criteria and inserted into the stack collection. Once the routine has fully built a particular stacking and found it to be successful, it removes it from the stack collection and places it into a "passed" collection from where it is then displayed for possible selection by the user.

Thus, once the stack collection is loaded with the initial structures sorted by goodness, the next step in the stacking process 28 of FIG. 9 is to determine if the desired number of successful stacking configurations has been created. This step is used to limit the number of displayed optimized stackings to some predetermined maximum number, say 25, and only comes into play once the routine has begun generating and displaying completed, successful stackings. In some cases, there will be only a small number of possible combinations of the precast components due to the specific dimensional and/or structural requirements for a structure and in such cases, the stacking routine might generate a total number of successful stackings that is less than the maximum number of stackings. In any event, until the program 20 has generated and displayed the maximum allowable number of successful stackings, the program will move through this check block to the next one in which it checks to see if there are stacks present in the stack collection. If not, then either all successful stackings have been moved to the passed collection or no stacking could be found that met all of the requirements placed on the structure, and the routine terminates.

Assuming there are stacks in the stack collection, the routine 28 next selects the most good stacking, which it can do based on the ordering of the stacks in the stack collection. The routine then generates all possible subsequent stackings (i.e., all of the possible next level component pieces that would be added onto that partial stack). Thus, for example, where the stack collection was initially loaded with three bases, the routine selects the first base (according to the sorted order that it was placed into the stack collection), and determines all of the possible next level components that could be placed on that base; for example, four different risers or one cover. There would then be five possible different stacking configurations (at this level) for that first base. The next step in the process is to determine whether or not all of these subsequent stacks have been tested and either eliminated or added into the stack collection for advancement to the next level of stacking. If there are some subsequent stacks that remain untested, the next step is to select one of these possible subsequent stacks and test it to determine to see if it fails any of the rules or heuristic limits. These heuristic limits can be used to eliminate, for example, equivalent alternative designs, as when the only difference between two potential stackings is that one includes a two inch adjusting ring on top of a six inch adjusting ring and the other stacking has the order of those two rings reversed.

If the stacking does not fail, then the next check that is done is to determine whether the stacking has passed all requirements for a successful stacking. For any stacking, this will not be true until the stack is completely built, in which case the stacking will be removed from the stack collection and placed into the passed collection and then displayed for possible selection by the user. Partial stacks, although perhaps not failing the requirements for dimensions, rules, and heuristic limits, will not pass this final test because the are not yet complete stackings. These partial stackings will then be inserted into the stack collection, sorted by goodness, for consideration at the next level of stacking. This inner looping continues until each potential subsequent stack for a stack at a particular level of stacking has been tested. The larger loop continues until all stacks at a particular level have been considered for subsequent stacking and continues until all stacks have been either eliminated or found to be successful and moved over to the passed collection.

Figure 10:
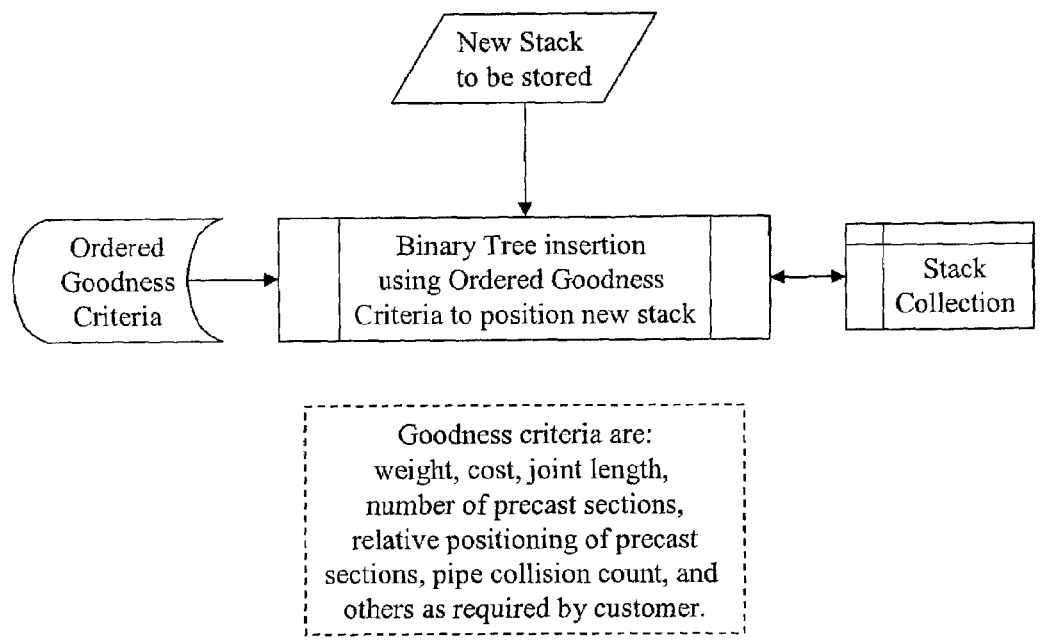
FIG. 10 is a diagram depicting the method utilized by the program of FIG. 1 to sort different stacking configurations based on goodness criteria.

As indicated in FIG. 10, each time the program 20 determines that a new stack is to be inserted into the stack collection, the new stack is sorted using the goodness criteria to determine where it is to be inserted into the stack collection. Application of the goodness criteria to the stacks can be handled in different ways that will be known to those skilled in the art. For example, the goodness criteria can be applied using an optimization algorithm such as A*. The goodness ordering of the partial stacks undergoing consideration can be the same as or different than that used to order the final set of displayed stackings.

Figure 11:
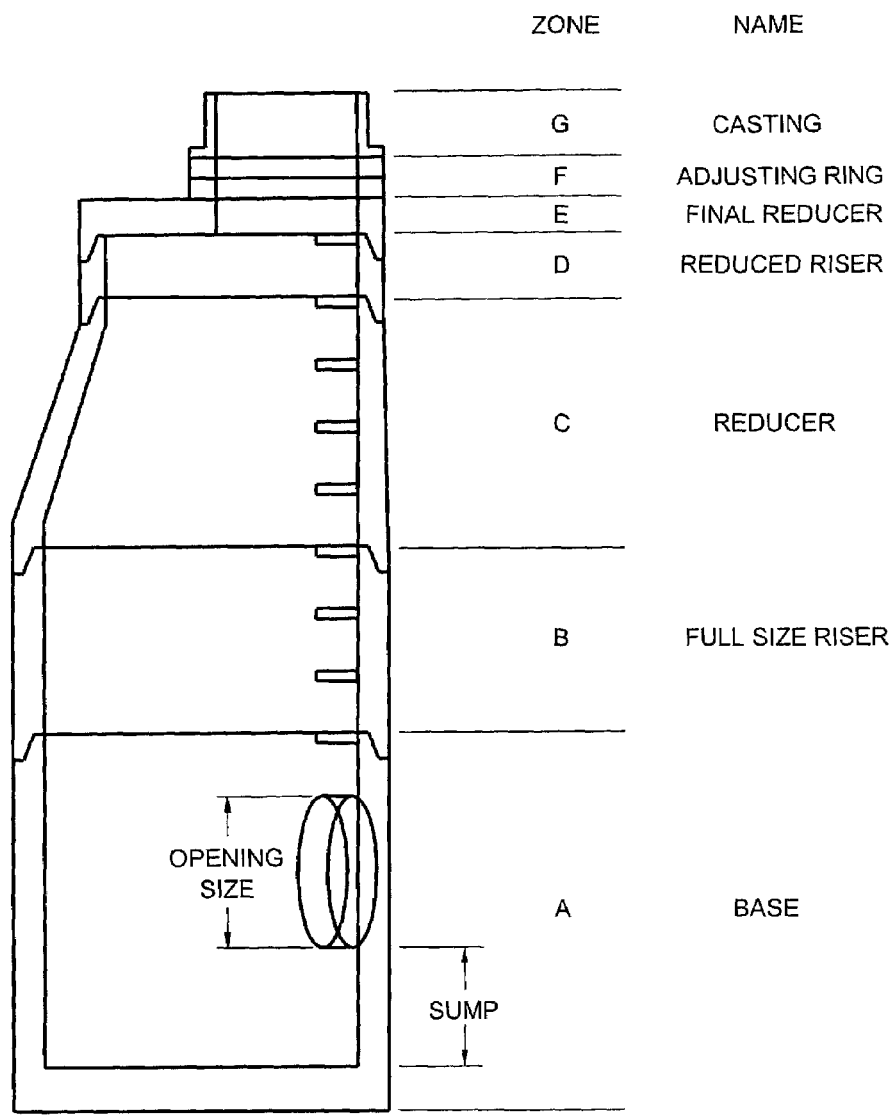
FIG. 11 is a manhole elevational diagram depicting a set of structural component zones used in accordance with a second embodiment of the stacking routine used by the stacking module of FIG. 4.

Referring now to FIGS. 11–15, a second embodiment 80 of the autostacking routine will now be described. As shown in FIG. 11, a manhole structure can be separated into a number of different zones, called Stack Zones, each of which is associated with a different functional portion of the manhole structure and thus with a different type of precast component. In the example shown, seven zones A–G are depicted and it will be appreciated that more or less zones could be used and that each zone can be associated with more than one type of precast component. In general, the autostacking process 80 of the second embodiment operates to (a) determine minimum and maximum heights that can be used in each zone, (b) determine lists of partial stacks for each zone that meet the minimum and maximum height requirements, (c) permute the heights of the partial stacks for the various zones to determine candidate height combinations of partial stacks, and (d) for each candidate height combination that meets the overall build height for the structure, generate candidate stacks by permuting the partial stacks of the different zones using those partial stacks for each zone which meet the zone height value used in that candidate height combination. The candidate stacks can then be checked against various rules such as mating conditions at the joints between the partial stacks, and are thereafter sorted by goodness as described above and displayed for the user in the sorted order. The user can then select a desired stacking.

Figure 12:
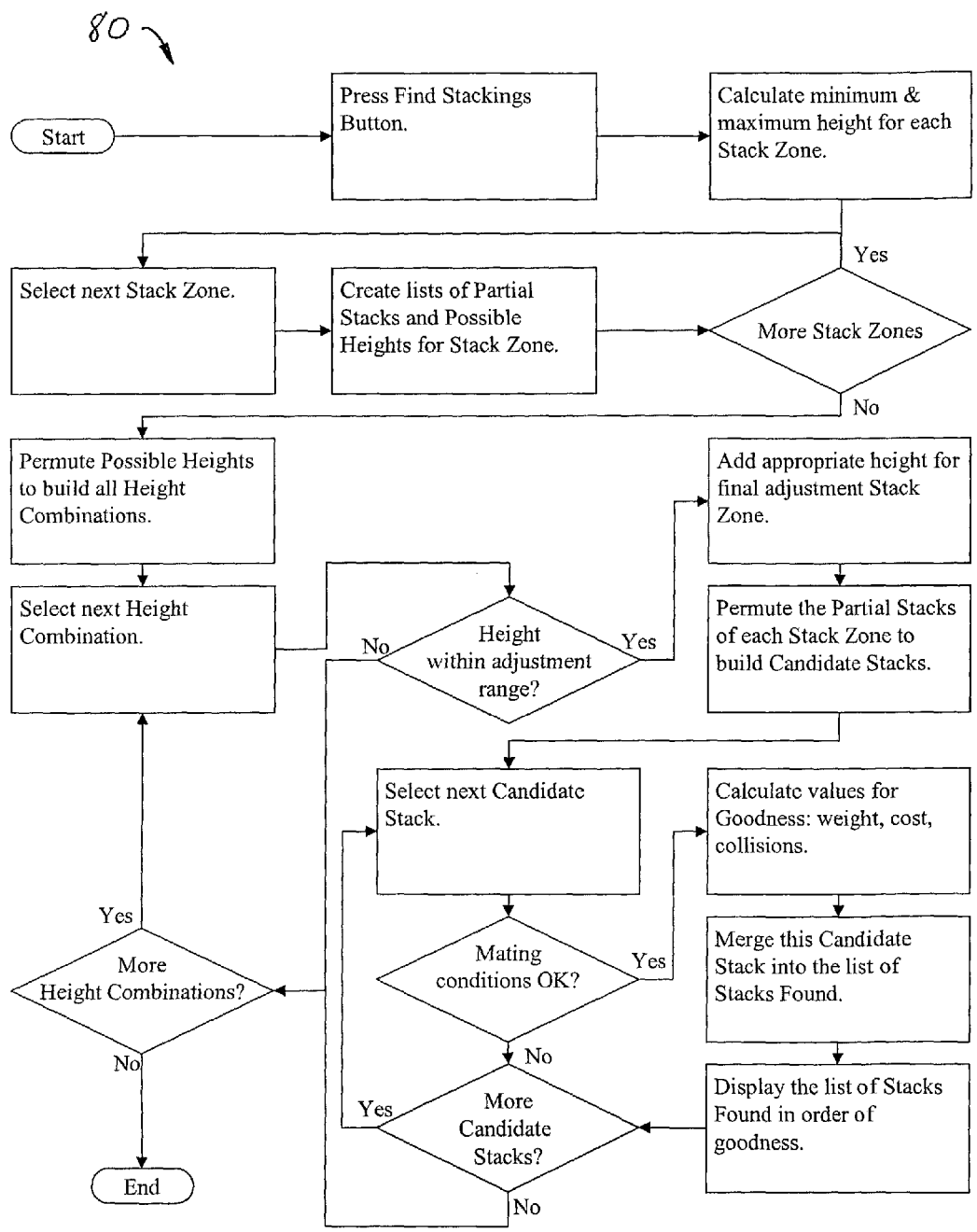
FIG. 12 is a flow chart depicting the second embodiment of the stacking routine.

More specifically, FIG. 12 depicts the overall stacking process. Once the routine starts and a user has defined the overall requirements for a structure including, in particular, the build height, the "Find Stackings" button is pressed (clicked) on the screen display to initiate the stacking routine. Minimum and maximum heights for each Stack Zone are calculated. For this purpose, certain user options can be provided that are selected by the user prior to clicking on the "Find Stackings" button on the computer screen. For example, the user can specify for each zone whether it is to contain "zero or more" precast sections or must contain one and not more than one section. "Zero or more" sections means that the Stack Zone can be entirely eliminated in some stacking combinations depending on whether or not the build height and other requirements can still be met. To calculate the minimum and maximums for each zone, the minimum height for any precast component within that zone is determined from the library of component data, and this may be modified by particular requirements such as jurisdictional rules that specify a certain minimum size for a certain precast component even though that type component may be commercially available in a smaller height. The minimums for each Stack Zone are added together and subtracted from the total build height, and the remainder specifies how much larger any single zone or any combination of zones can be to meet the overall build height required. Thereafter, the maximums for each zone are determined using this remainder along with the information from the database concerning the heights of the different components for that zone. Where a maximum for a particular zone has been pre-specified, then that maximum is used if it is less than the calculated value.

Once the minimums and maximums are calculated, the routine 80 creates a list of Partial Stacks and Possible Heights for each of the Stack Zones involved. The Partial Stacks for each zone are stacks of one or more precast components that meet the minimum and maximum height requirements for that zone. The Possible Heights are the resulting heights of the Partial Stacks that successfully meet the height requirements (minimums and maximums) for the zone. The procedure for determining these sets is discussed below in connection with FIG. 13. Once these lists of Partial Stacks and Possible Heights have been developed for each of the zones, the routine permutes the Possible Heights from the different zones to generate a set of all possible Height Combinations. Thus, for example, if the Possible Heights for zone A were 48" and 72" and for zone B were 24", 36", and 48", then (ignoring the combinations involving the other zones), the program 20 would develop Height Combinations that include all of the permutations of the two zone A heights with the zone B heights, giving possible Height Combinations of (48", 24"), (48", 36"), (48", 48"), (72", 24"), (72", 36"), and (72", 48"). This permutation of Possible Heights from the different zones to develop a set of Height Combinations is described farther below in connection with FIG. 14. It will thus be appreciated by those skilled in the art that each Height Combination includes a particular height value for each zone in the combination that meets the minimum and maximum height requirements for that zone. Some Height Combinations will have the same zone height for a particular zone while others may have a different zone height for that same zone.

Once all of the Height Combinations have been selected, the routine loops through a process that involves taking each Height Combination, determining if it meets the overall build height for the structure, and if so, going back to the Partial Stacks for each zone and selecting those having a height that equals the zone height for that zone in the current Height Combination, and permuting all of those Partial Stacks together for the various zones to develop Candidate Stacks. Rather than permuting all zones, the routine identifies a single zone (e.g., Zone F) as a final adjustment Stack Zone that is not used in developing the Height Combinations. Thus, to check whether a particular Height Combination meets the overall build height for the structure, the routine determines if the height of the Height Combination is within an adjustment range that is provided by the structures used in the adjustment zone (F). For any particular Height Combination, once the Candidate Stacks are developed, their mating conditions are checked; that is, the male or female joint types for each of the sections are checked to make sure that there is proper mating at the joints. If not, the Candidate Stack is thrown away. If the mating conditions of the various components are okay, then the Candidate Stack is analyzed to determine its goodness and it is sorted with other successful Candidate Stacks and displayed for the user. This process is repeated until each of the Height Combinations have been processed or until the user selects one of the displayed stackings.

Figure 13:
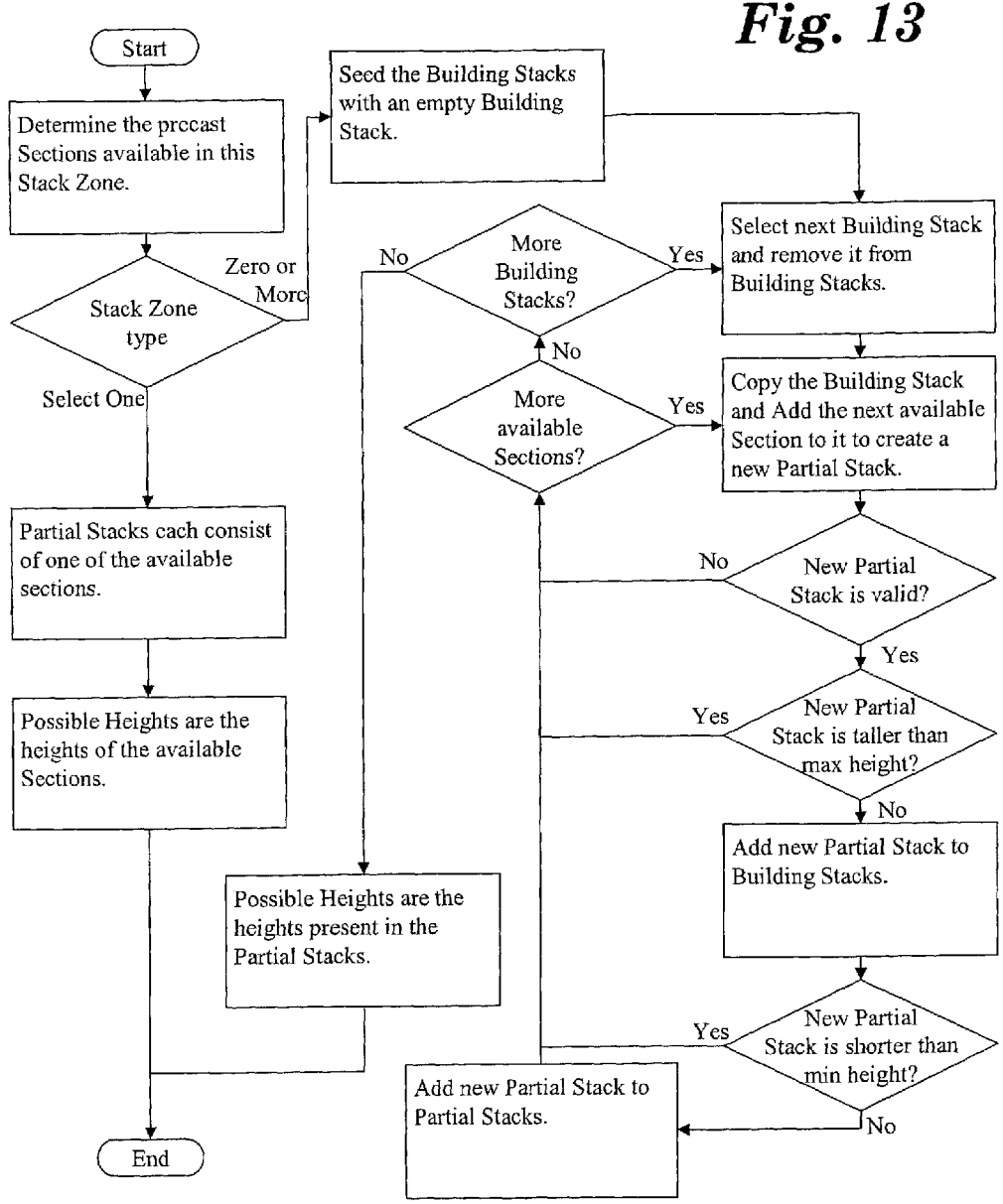
FIG. 13 is a flow chart showing details of the routine used in FIG. 12 to create lists of partial stacks and sets of possible zone heights for each of the different zones that may be used in a particular structure.
Figure 14:
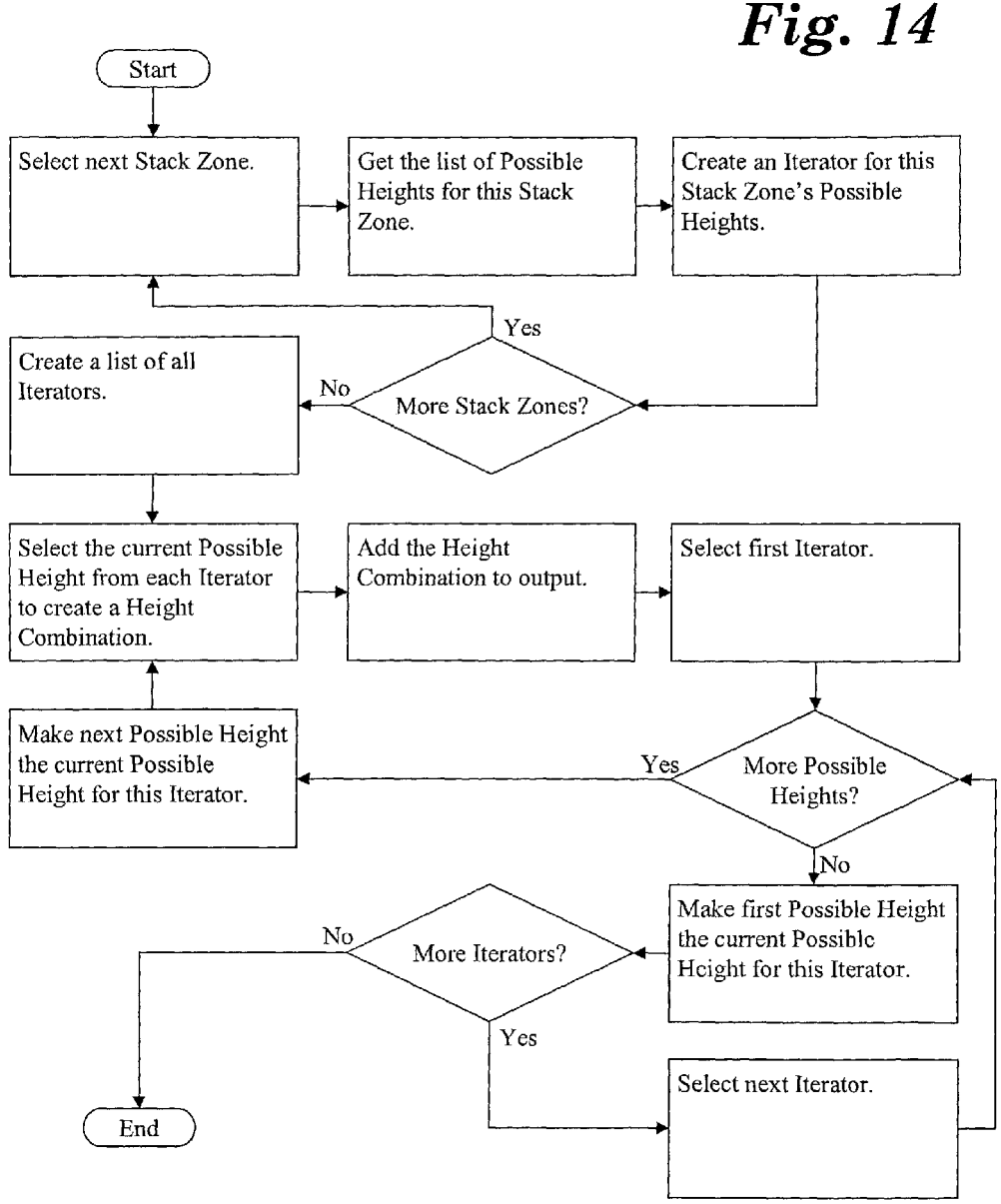
FIG. 14 is a flow chart showing details of the routine used in FIG. 12 to permute combinations of the possible zone heights determined using the routine of FIG. 13.

FIG. 13 depicts the procedure used in the process of FIG. 12 to determine the Partial Stacks and Possible Heights for each zone. The first step is to determine which precast components (sections) are available for this Stack Zone. If the user has specified that one and only one precast section is to be used in this zone (by clicking on the "Select One" option on the user interface), then the Partial Stacks each consist of a single precast section associated with this zone that meets the minimum and maximum height requirements, if any, established for the zone. The Possible Heights for this zone are then the individual heights of those single precast sections Where "zero or more" sections have been specified for the zone, the routine runs through two levels of nested loops in which Partial Stacks are built up a layer at a time and, if they fall within the established minimum and maximums for the zone, they are added to the list of Partial Stacks outputted by the routine. The inner loop checks all of the different precast components for the zone at a particular layer of the Partial Stack being built, while the outer loop insures that all possible combinations of precast components are tried.

In particular, the Partial Stacks are developed by maintaining a collection of Building Stacks and a separate collection of the Partial Stacks that pass all height limits and validity checks. The Building Stacks collection is seeded with a single empty stack which, during the first iteration of the nested looping, is removed from the Building Stack and used to start different stacks at a first layer using the inner loop shown. A different precast section is added to the empty Building Stack at each iteration of the inner loop to thereby create a new Partial Stack during each inner iteration. Each Partial Stack is checked for validity to eliminate such things as equivalent alternatives (e.g., a stack of two 2' risers is equivalent to a 4' riser), followed by a check to see if the Partial Stack is greater in height than the maximum for the zone. If not, it is added to the Building Stacks (so that it may be used in later iterations of the outer loop for the next layer of stacking). If the Partial Stack also meets the minimum height requirement, then, having satisfied all of the preconditions for a Partial Stack, it is added to the collection of Partial Stacks. Once all of the different precast components have been used to create a one-layer Partial Stack, no more precast sections are available so they process falls out of the inner loop and checks to see if there are more Building Stacks in the collection of Building Stacks. This collection will now include all individual precast sections that did not exceed the validity and maximum height tests. Thereafter, each of the Building Stacks will be added onto using each of the precast sections to form new Partial Stacks to be tested along with possible other new Building Stacks being created according to the inner loop procedure described above. This processing will continue until no more new Building Stacks are created and all Building Stacks that had been in the collection have been removed and processed. The result is a collection of Partial Stacks meeting the height and validity requirements for the zone. Thereafter, the Possible Heights are the heights of the different Partial Stacks in the collection.

As described above in connection with FIG. 12, these Possible Heights are then permuted with the Possible Heights for all of the other zones to generate a set of Height Combinations. This procedure will now be described in connection with FIG. 14. For each zone, an iterator is created that is used to iterate through the total number of different Possible Heights that exist for that zone. Thus, where zones A–E and G are being permuted (with zone F being a final adjustment zone), six iterators a, b, c, d, e, and g could be created, each relating to one of the zones. The cardinality of each iterator depends on the number of Possible Heights in its associated zone. Thus, for example, where zone A has three Possible Heights, the iterator a would iterate through 1, 2, and 3 before being reset back to 1.

Once all of the iterators are created, they are all initialized to 1 to identify the first Possible Height in their zone as the current Possible Height. The current Possible Heights from each zone are then added to form a Height Combination which is outputted (saved). Then, the first iterator is selected and checked to see if it is at its last number; that is, are there any more Possible Heights for the zone to which that iterator relates. For iterator a, there are three so that it is incremented from its initial value of 1 to its next value 2. A new Height Combination is then produced using this second Possible Height from zone A. This loop repeats for a=3 at which point it is determined that, for iterator a there are no more Possible Heights and the routine resets the iterator a to 1 to again make the first Possible Height in that zone the current Possible Height. A check is then made to see if there are more iterators (such as b, c, etc.) in which case the next iterator (b) is selected and checked to see if it has more than just one Possible Height. If so, the loop repeats, building Height Combinations using the second Possible Height for zone B along with each of the Possible Heights for zone A. This repeats for each additional Possible Height in zone B (by incrementing its iterator b). Once that is done, the next iterator (c) is selected and the process repeats for each combination of Possible Heights from zones A and B. This continues for all iterators until all Height Combinations have been produced. As an abbreviated example, where there are the three Possible Heights for zone A, two for zone B, and two for zone C, the combinations (a,b,c) of heights for these three zones resulting from the routine of FIG. 14 will be (1,1,1) (2,1,1) (3,1,1) (1,2,1) (2,2,1) (3,2,1) (1,1,2) (2,1,2) (3,1,2) (1,2,2) (2,2,2) (3,2,2).

Figure 15:
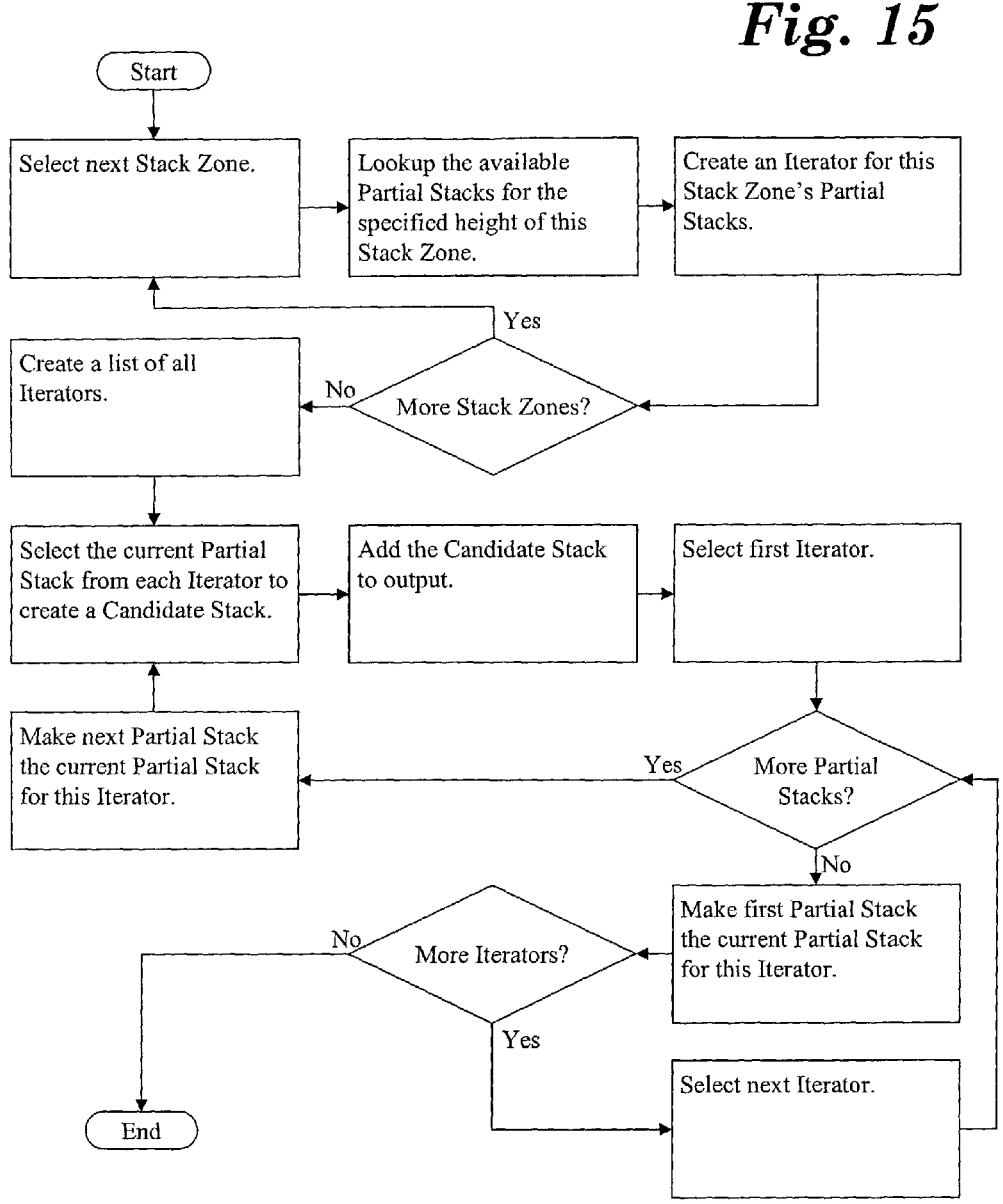
FIG. 15 is a flow chart depicting further details of the routine used in FIG. 12 to permute combinations of the partial stacks that were developed by the routine of FIG. 13 using the combinations of zone heights determined by the routine of FIG. 14.

As discussed above in connection with FIG. 12, once all of these Height Combinations are determined, they are then selected one at a time, checked to see if they fit within an adjustment range of the overall build height, and then the Partial Stacks that fit the Possible Heights used in the Height Combinations are permuted, checked for proper mating, and sorted based on the goodness criteria discussed above. FIG. 15 depicts the process used to permute the Partial Stacks for each Height Combination to generate the Candidate Stacks that are subsequently checked for mating conditions. The permutation approach is the same as discussed in connection with FIG. 14 and so need not be repeated. It will be understood, however, that whereas combinations of Possible Heights were being produced by the routine of FIG. 14, actual Candidate Stacks of precast components are being determined by the routine of FIG. 15 using the Partial Stacks developed earlier, and it will be appreciated that, for any one Height Combination, only the Partial Stacks for each zone that have a height equal to that zone's Possible Height in the Height Combination are used. Thus, although there may be ten Partial Stacks for a particular zone, only one or two of them may have a height equal to the Possible Height used in a particular Height Combination.

In this second embodiment using the zones, further user control can be provided by breaking each zone into "above", "in", and "below" subzones, each having their own rules associated therewith. This can allow a user to specify, for example, what type component must appear immediately above or below a certain zone, and these subzones can be processed by the routine described above as entirely separate zones. Furthermore, in the coding of the program 20, each zone and subzone can be uniquely identified using a label or identifier that is ordered relative to the other identifiers according to its level so that the order of the zone identifiers indicates the order of the zones.

It will thus be apparent that there has been provided in accordance with the present invention a drainage system design method and apparatus which achieves the aims and advantages specified herein. It will of course be understood that the foregoing description is of an embodiment of the invention and that the invention is not limited to the specific embodiment shown. Various changes and modifications will become apparent to those skilled in the art. For example, the database of precast structures need not be stored locally on the same computer used to execute the drainage system design process, but could be remotely located on a server accessible to the computer running the drainage system design software. Similarly, other such data, including goodness criteria or local governmental rules, could be remotely located as well on one or more other servers. Furthermore, the drainage system design software need not be executed locally on a client computer, but could be run remotely via a web interface using active server pages or other interface approaches which are well known to those skilled in the art. All such variations and modifications are intended to come within the scope of the appended claims.

In the claims:

1. A computer-readable memory having a computer program for use in drainage systems, comprising:
    a digital storage device;
    a computer program stored on said digital storage device, said program being operable upon execution by a computer to present a user with a graphical user interface that enables the user to input into the computer dimensional and structural information concerning the drainage system;
    wherein said program is operable to access a set of predefined drainage system components and, using the inputted dimensional and structural information, said program is operable to determine different configurations of the predefined components that represent a structure contained in the drainage system;
    wherein said program is further operable to select at least one of the configurations based on one or more criteria and is operable to present the selected configuration(s) to the user via the graphical user interface; and
    wherein the different configurations of the predefined components comprise different stacking configurations of at least one manhole or catch basin in the drainage system, and wherein said program is operable to determine the different stacking configurations using data relating to the predefined components.

2. A computer-readable memory as defined in claim 1, wherein said program is operable to sort the different stacking configurations based on the one or more criteria.

3. A computer-readable memory as defined in claim 2, wherein said criteria include a plurality of goodness criteria and wherein said program utilizes an optimization routine for sorting the different stacking configurations based on the goodness criteria.

4. A computer-readable memory as defined in claim 3, wherein said goodness criteria are prioritized.

5. A computer-readable memory as defined in claim 2, wherein said program is operable to carry out multiple iterations of a routine in which the program builds the different stacking configurations.

6. A computer-readable memory as defined in claim 5, wherein the structure includes a plurality of zones of different drainage system components, said program being operable to determine minimum and maximum heights for each of the zones and, for at least some of said zones, said program being operable to determine sets of partial stacks of said drainage system components that fit within the minimum and maximum heights established for that zone.

7. A computer-readable memory as defined in claim 1, wherein said predefined components include precast manhole sections.

8. A computer-readable memory as defined in claim 1, wherein said predefined components include precast catch basin sections.

9. A computer-readable memory as defined in claim 1, wherein said program is operable to display a number of the selected stacking configurations and is further operable to permit the user to select among the displayed stacking configurations.

10. A computer-readable memory as defined in claim 9, wherein said program is operable to generate at least one structural drawing of a selected configuration.

11. A computer-readable memory as defined in claim 10, wherein said structural drawing comprises an elevational view of the structure.

12. A computer-readable memory as defined in claim 10, wherein said structural drawing comprises a plan view of the structure.

13. A computer-readable memory having a computer program for use in designing drainage systems, comprising:
    a digital storage device;
    a computer program stored on said digital storage device, said program being operable upon execution by a computer to present a user with a graphical user interface that enables the user to input into the computer dimensional and structural information concerning the drainage system;
    wherein said program is operable to access a set of predefined drainage system components and, using the inputted dimensional and structural information, said program is operable to determine different configurations of the predefined components that represent a structure contained in the drainage system;
    wherein said program is further operable to select at least one of the configurations based on one or more criteria and is operable to present the selected configuration(s) to the user via the graphical user interface; and
    wherein said program is operable to permit the user to modify structural features of one or more of the predefined components to thereby define a unique component, and wherein said program is operable to utilize the unique component in one or more of the configurations.

14. A computer-readable memory as defined in claim 13, wherein said program is operable to generate a structural drawing of each unique component.

15. A computer-readable memory as defined in claim 1, wherein said program is operable to select only those configurations of the predefined components that meet one or more requirements for the drainage system.

16. A computer-readable memory as defined in claim 15, wherein said one or more requirements comprise a set of rules that are specific to the set of predefined components.

17. A computer-readable memory as defined in claim 15, wherein said one or more requirements comprise at least one governmental requirement and/or at least one customer preference relating to drainage systems.

18. A computer-readable memory as defined in claim 1, wherein said graphical user interface includes a number of different screen displays presented to the user.

19. A computer-readable memory as defined in claim 18, wherein said screen displays include a flow tree screen display, a location screen display, and structure screen display.

20. A computer-readable memory having a computer program for use in designing drainage systems, comprising:
a digital storage device;
a computer program stored on said digital storage device, said program being operable upon execution by a computer to present a user with a graphical user interface that enables the user to input into the computer dimensional and structural information concerning the drainage system;
wherein said program is operable to access a set of predefined drainage system components and, using the inputted dimensional and structural information, said program is operable to determine different configurations of the predefined components that represent a structure contained in the drainage system;
wherein said program is further operable to select at least one of the configurations based on one or more criteria and is operable to present the selected configuration(s) to the user via the graphical user interface; and
wherein said program is operable to generate a bill of materials covering the different predefined components included in the one or more configurations.

21. A computer-readable memory having a computer program for use in designing underground drainage systems, comprising:
a digital storage device;
a computer program stored on said digital storage device, said program being operable upon execution by a computer to present a user with a graphical user interface that enables the user to input into the computer dimensional and structural information concerning manhole structures used in the underground drainage system;
wherein said program is operable to access a set of predefined drainage system components that represent precast manhole components used in building underground manhole structures from stackings of the precast components and, using the inputted dimensional and structural information, said program is operable to determine stacking configurations of the predefined components that represent different manhole structures contained in the underground drainage system; and
wherein said program is further operable to determine one or more underground drainage system designs using one or more criteria, and wherein said one or more underground drainage system designs comprise a stacking configuration of the predefined components for each of two or more of the manhole structures contained in the underground drainage system.

22. A computer-readable memory as defined in claim 21, wherein said program is operable to generate at least one site plan drawing using the drainage system design.

23. A computer-readable memory as defined in claim 21, wherein said program is operable to generate at least one elevational drawing using the drainage system design.

24. A computer-readable memory as defined in claim 21, wherein said program is operable to determine a plurality of stacking configurations for one or more of the manhole structures and is operable to permit the user to select among alternative configurations.

25. A computer-readable memory as defined in claim 24, wherein said program is operable to generate at least one structural drawing of a selected configuration.

26. A computer-readable memory as defined in claim 25, wherein said program is further operable to select at least one of the configurations based on one or more criteria and is operable to present the selected configuration(s) to the user via the graphical user interface.

27. A computer-readable memory as defined in claim 26, wherein said program is operable to sort the different stacking configurations based on the one or more criteria.

* * * * *